United States Patent
Goh

(10) Patent No.: US 8,310,285 B2
(45) Date of Patent: Nov. 13, 2012

(54) PROCESS, TEMPERATURE, PART AND SETTING INDEPENDENT RESET PULSE ENCODING AND DECODING SCHEME

(75) Inventor: Beng-Heng Goh, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 120 days.

(21) Appl. No.: 12/942,808

(22) Filed: Nov. 9, 2010

(65) Prior Publication Data

US 2012/0112803 A1    May 10, 2012

(51) Int. Cl.
*H03L 7/00* (2006.01)
(52) U.S. Cl. ........................................ 327/142; 327/198
(58) Field of Classification Search .................. 327/142, 327/143, 198
See application file for complete search history.

(56) References Cited

U.S. PATENT DOCUMENTS

| | | | | |
|---|---|---|---|---|
| 3,840,814 A * | 10/1974 | Schiffman | ..................... | 327/176 |
| 3,965,470 A * | 6/1976 | Clinard et al. | ................ | 342/195 |
| 6,040,722 A * | 3/2000 | Lee | ................. | 327/143 |
| 6,175,603 B1 * | 1/2001 | Chapman et al. | ............. | 375/354 |
| 6,665,367 B1 * | 12/2003 | Blair | ............................... | 377/20 |
| 7,518,423 B2 * | 4/2009 | Kumata | ........................ | 327/158 |
| 8,198,925 B1 * | 6/2012 | Wang | ............................ | 327/142 |
| 2012/0112804 A1 * | 5/2012 | Li et al. | ........................ | 327/142 |

FOREIGN PATENT DOCUMENTS

JP          2008040691 A  *  2/2008

* cited by examiner

*Primary Examiner* — Lincoln Donovan
*Assistant Examiner* — William Hernandez
(74) *Attorney, Agent, or Firm* — Hogan Lovells US LLP

(57) ABSTRACT

A method of generating a reset signal for an integrated circuit without a dedicated reset pin includes calibrating a first clock pulse from a clock signal, measuring a second clock pulse from the clock signal, measuring a third clock pulse from the clock signal, and generating an internal reset signal if the first clock pulse width is longer than a predetermined minimum clock pulse width, if the second clock pulse is within an expected first value range, and if the third clock pulse is within an expected second value range.

18 Claims, 4 Drawing Sheets

PROCESS, TEMPERATURE, PART AND SETTING INDEPENDENT RESET PULSE ENCODING AND DECODING SCHEME

BACKGROUND OF THE INVENTION

1. Field of the Invention

The present invention is related to reset circuits and more particularly to a reset circuit and method for an integrated circuit having a clock pin and a data pin, but no dedicated reset pin.

2. Description of the Related Art

Reset circuits are well known in the art for resetting one or more operational modes of an integrated circuit. An integrated circuit can have an extra pin dedicated to the reset function for receiving a reset pulse provided by a controller. Not all chips, however, have a separate reset pin. The chip can also be reset by using a power on reset technique as is also known in the art. However, this requires the chip to be shut down and the recovery time is longer for normal functions and also longer test times are required, which translates to undesirable higher costs.

What is desired, therefore, is a reset function for a chip with no reset pin that can provide a reset function during normal and test modes without going into a power down mode, which requires the whole system to be shut down and takes longer time to recover.

SUMMARY OF THE INVENTION

According to the present invention a reset circuit includes first, second, and third counters for receiving a first clock signal and a second clock signal, a first comparator coupled to an output of the first and second counters, a second comparator coupled to an output of the second and third counters, and a reset generator coupled to an output of the first comparator and to an output of the second comparator for generating a reset signal. The reset circuit is included on an integrated circuit wherein the first clock signal is an external clock signal and the second clock signal is an internal clock signal. The integrated circuit includes a clock pin for receiving the first clock signal and a data pin for receiving a data signal but lacks a dedicated reset pin. A first divider circuit is interposed between the output of the first counter and an input of the first comparator. A second divider circuit is interposed between the output of the second counter and an input of the second comparator. The reset circuit further includes a finite state machine. The first counter includes an enable input coupled to a calibrate output of the finite state machine, the second counter includes an enable input coupled to a first measurement output of the finite state machine, and the third counter includes an enable input coupled to a second measurement output of the finite state machine. Ideally, the reset signal comprises a reset pulse that is used by the integrated circuit to reset the circuit without the need for a dedicated reset pin or for entering into a power down mode.

In operation, a method of generating an internal reset signal for an integrated circuit lacking a reset pin includes calibrating a first clock pulse from an external clock signal, measuring a second clock pulse from the external clock signal, measuring a third clock pulse from the external clock signal, and generating an internal reset signal. The method of the present invention returns to an idle condition if the calibration of the first clock pulse fails. The method of the present invention also returns to an idle condition if the measurement of the second clock pulse or the third clock pulse is not equal to an expected value. In the method of the present invention the second clock pulse width is about half that of the first clock pulse width, and the third clock pulse width is about half that of the second clock pulse width.

With the calibration mode built-in to the circuit and method of the present invention, the generation of the reset signal is independent of process, temperature, integrated circuit and system variations. Minimal circuitry is required for implementation of the reset circuit. With continuous tracking using the built-in calibration mode, the integrated circuit can repeatedly and reliably detect the encoded reset pulses and enter into a reset mode.

According to the present invention, a chip can be reset during normal and test mode and recover in the shortest possible time without a dedicated reset pin. The reset circuit of the present invention is process, temperature, part and system independent due to continuous tracking performed by the calibration mode. A valid reset pulse will always be generated regardless of the matching between the chip with the reset circuit and the external controller (in terms of frequency and phase differences of the clocks in the chip and the controller).

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Figure 1:
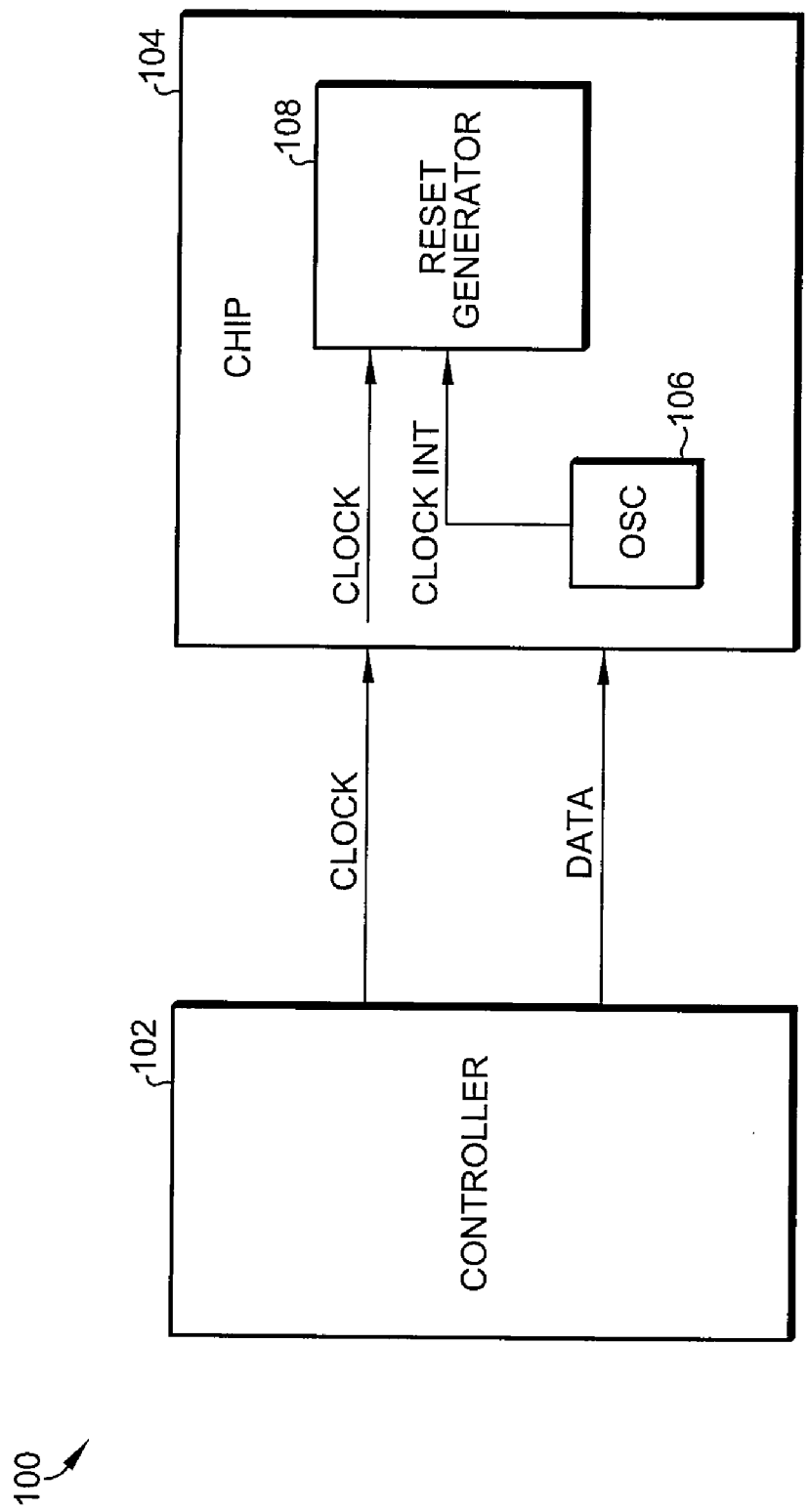
FIG. 1 is a block diagram of a system including a controller and an integrated circuit with a reset circuit according to the present invention.

Referring now to FIG. 1, a block diagram of a system 100 according to the present invention is shown including a controller 102 and an integrated circuit 104 with a reset circuit 108 and an oscillator 106 for generating an internal clock signal. The integrated circuit has a CLOCK pin for receiving an external clock signal generated by the controller 102, and a DATA pin for receiving a data signal also provided by the controller. The integrated circuit 104 has no RESET pin, however. The reset circuit 108 has a first input for receiving the external clock signal and a second input for receiving the internally generated clock signal from the oscillator 106. While no output is shown in FIG. 1 it is understood by those skilled in the art that the reset output signal from the reset circuit 108 is used by internal circuitry to reset those portions of the chip, or the entire chip according to known circuit techniques.

Figure 2:
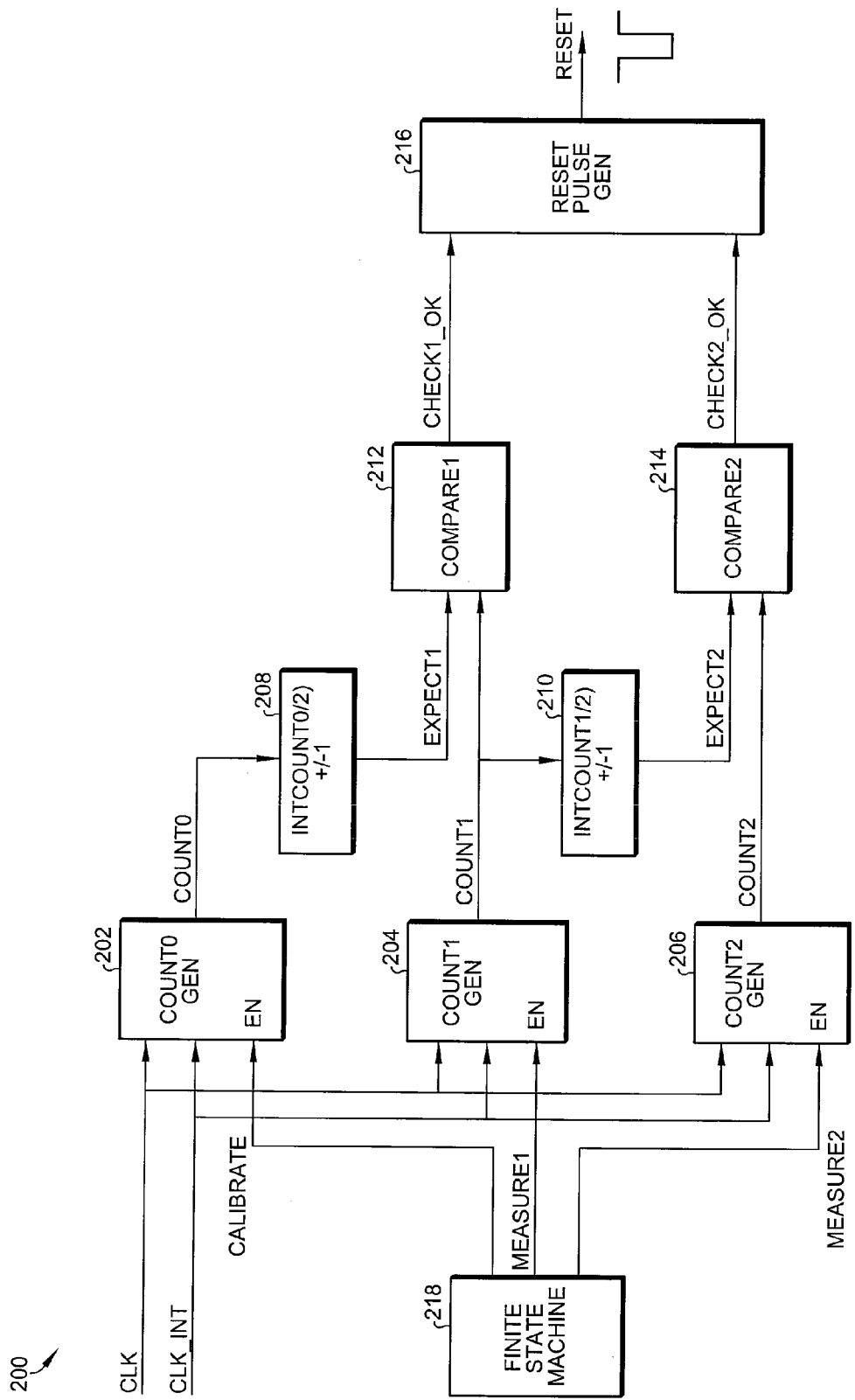
FIG. 2 is a block diagram of the reset circuit according to the present invention.

Referring to FIG. 2, a block diagram of a reset circuit 200 is shown according to the present invention, including first, second, and third counters 202, 204, and 206 for receiving a first clock signal CLK (external) and a second clock signal CLK_INT (internal). A first comparator 212 (COMPARE1) is coupled to an output of the first and second counters 202 and 204. A second comparator 214 (COMPARE2) is coupled to an output of the second and third counters 204 and 206. A reset generator 216 is coupled to an output of the first comparator (CHECK1_OK) and to an output of the second comparator (CHECK2_OK) for generating a reset signal (RESET) such as a reset pulse or step. In a preferred embodiment, the reset circuit 200 is fabricated on an integrated circuit with other circuit functions, but wherein the integrated circuit lacks a dedicated RESET pin. The reset circuit 200 further includes a divider circuit 208 (INTCOUNT0/2) interposed between the output of the first counter COUNT0 and an input of the first comparator 212. The reset circuit 200 further includes a divider circuit 210 (INTCOUNT1/2) interposed between the output of the second counter COUNT1 and an input of the second comparator 214. In addition, the reset circuit 200 includes a finite state machine 218 having a calibrate output (CALIBRATE), a first measurement output (MEASURE1), and a second measurement output (MEASURE2). The first counter 202 includes an enable input coupled to the calibrate output of the finite state machine 218. The second counter 204 includes an enable input coupled to the first measurement output of the finite state machine 218. The third counter 206 includes an enable input coupled to the second measurement output of the finite state machine 218.

Figure 3:
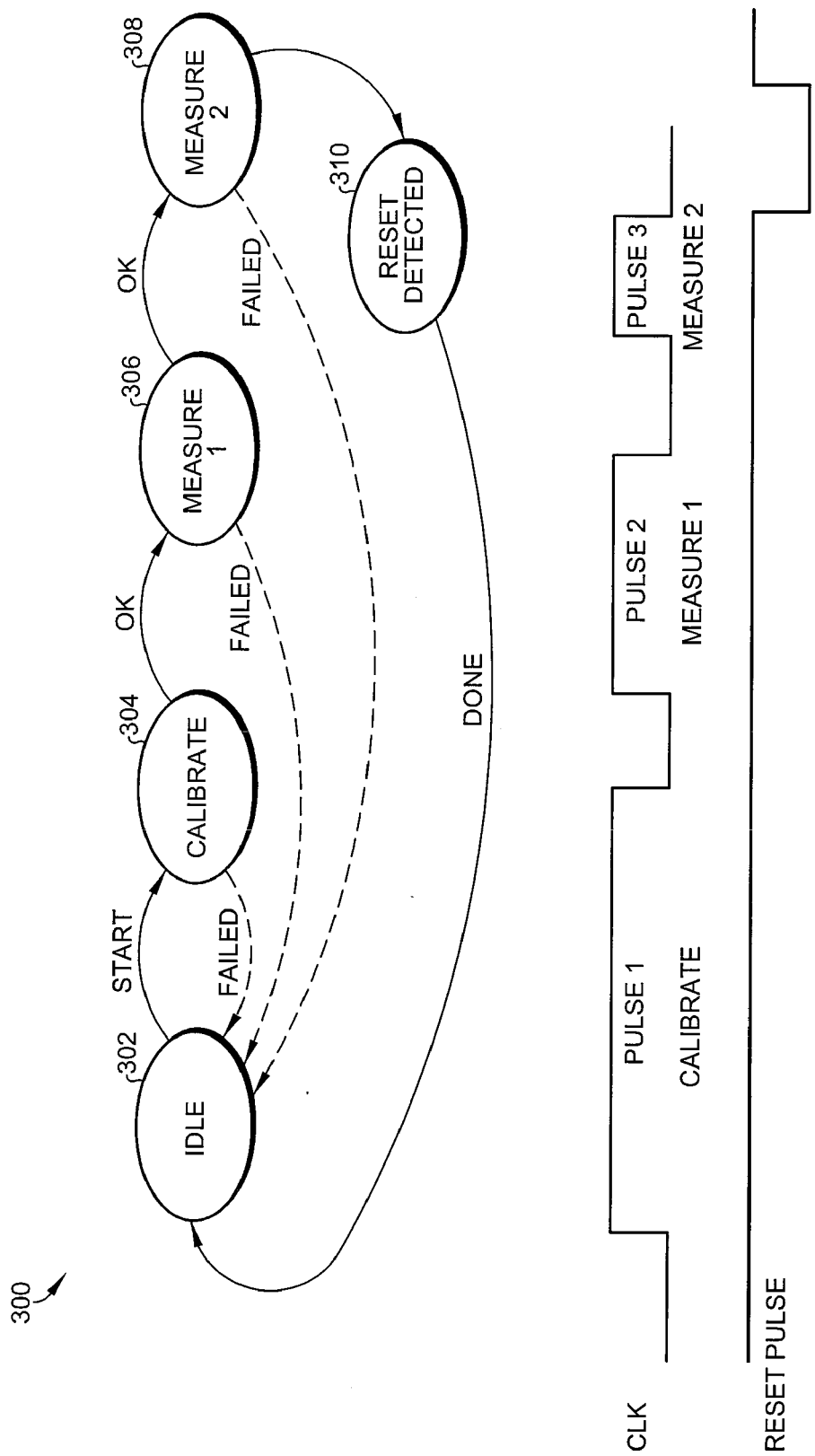
FIG. 3 is a state diagram and a corresponding timing diagram of the method of generating a reset signal according to the present invention.

Referring now to FIG. 3, a state diagram 300 and a corresponding timing diagram are shown illustrating the method of generating a reset signal according to the present invention. The method of generating an internal reset signal for an integrated circuit lacking a reset pin begins with the integrated circuit being in an idle mode 302. The method of the present invention starts with calibrating a first clock pulse from an external clock signal at step 304, then measuring a second clock pulse from the external clock signal at step 306, then measuring a third clock pulse from the external clock signal at step 308, and finally detecting and generating an internal reset signal at step 310, as well as returning to the idle state 302. The method of the present invention returns to the idle condition 302 if the calibration of the first clock pulse fails. The method of the present invention also returns to the idle condition 302 if the measurement of the second clock pulse is not equal to an expected value, or the measurement of the third clock pulse is not equal to an expected value, which may be different than the expected value for the second clock pulse. For example, in a preferred embodiment the expected value for the second clock pulse width is about half that of the first clock pulse width, and the expected value for the third clock pulse width is about half that of the second clock pulse width. This is clearly shown in the corresponding timing diagram, with a calibrate clock pulse having a first pulse width greater than a predetermined minimum pulse width, a first measurement clock pulse having a second pulse width about half that of the calibrate clock pulse, and a second measurement clock pulse having a third pulse width about half that again of the first measurement clock pulse. Note that the reset pulse is generated after the measurement of the second measurement clock pulse.

The method of the present invention is now described in further detail with respect to FIGS. 1, 2, and 3. According to the present invention, the reset pulse encoding and decoding is multiplexed onto an existing pin. According to the present invention, the CLK pin is chosen for this multiplexing function. The controller 102 encodes the reset pulse to be decoded by the chip 104 with the reset pulse decoding occurring via the CLK pad.

The controller 102 first issues a CLK pulse (Pulse 1) to the chip 104 at the CLK pin. This starts the state machine 218 going from the IDLE state 302 to the CALIBRATE state 304. If the duration of the first CLK pulse is of greater than a certain predetermined number of the clock cycles in the chip, it will register this count (C1) and go to the MEASURE1 state. Otherwise, the state machine will go back to IDLE state 302 again. The purpose of checking the minimum pulse width of the first CLK pulse is to make sure that only certain pulse widths can start the reset decoding process. This will reduce errors and the possibility of entering into a false reset state.

At the MEASURE1 state 306, the new CLK high duration (Pulse 2) will be measured and compared with the expected count of $C2=(C1/2+/-1)$. If the count value is within $(C1/2-1)$ to $(C1/2+1)$, the count C2 will be registered to be used for the next state 308 (MEASURE2). Otherwise, it fails and the state machine 218 will go back to the IDLE state 302 again.

At the MEASURE2 state 308, the next CLK high duration (Pulse 3) will be measured and compared with the expected count of $C3=(C2/2+/-1)$. If the count value is within $(C2/2-1)$ to $(C2/2+1)$, the reset pulse is detected from the controller 102 and the chip 104 will appropriately generate a reset pulse to reset the chip. After the reset cycle, the reset pulse state machine 218 goes into the IDLE state 302 again.

It is important to note that, for the method and circuit of the present invention to work properly, a clock generator 106 resident on the chip is required and a CLK pin for receiving a clock signal from the controller 102 is also required.

It is also important to note that the proposal of using half (halving scheme) of the previous measure count for MEASURE1 and MEASURE2 comparisons is to have a unique reset pulse signature and ease of implementation. Note that there is no predefined count number for the reset pulse duration. Some examples according to the present invention could be: C1=50, C2=25, C3=12 (13 depending on phases and skew of the clock) and C1=37, C2=19, C3=9.

It is also important to note that the measure and compare states always use the previous count, which is more accurate. That is, MEASURE2 uses C2 as reference instead of C1.

It is also important to note that the method of the present invention compares within a range of count +/−1 to take care of skew or phase differences between the chip and the controller.

Finally, it is also important to note that the reset pulse detection scheme of the present invention uses a CALIBRATE, MEASURE1 and MEASURE2 sequence to avoid erroneous detection due to noise. A CALIBRATE and MEASURE1 only sequence might be sufficient. Alternatively, the number of measure and compare states (e.g. MEASURE3, MEASURE4 . . . ) can be increased to make the reset pulse signature more robust. The method of the present invention can be altered to measure for doubling of a previous count instead of halving. Other such schemes for providing an expected value can also be used.

In conclusion, the method of the present invention uses two steps in the reset decoding scheme: a synchronization phase of calibrating the clock from both the chip and the controller, and a measurement and comparison phase of reset pulses encoded from the controller.

For the synchronization phase of calibrating the clocks from both the chip and the controller, there are three possible solutions:

i) Include the CALIBRATE mode in the decoding scheme to continuously calibrate both the chip and the controller clocks. This is as demonstrated in the above state machine. The advantage of this approach is that it is a simple scheme and easy to implement. No predefined reset pulse width is required.

ii) To include a circuit to synchronize the chip clock frequency to that of the clock (CLK) from the controller. The number of clock cycles for reset decoding must be predefined.

It is a continuous tracking system but larger decision circuitry is required for implementation.

iii) To include a system calibrate mode to measure the reset pulse duration and register it for use in the measurement and comparison phase of the reset pulse decoding design. The disadvantage of this approach is that calibrate must be done regularly to continuously track the clocks of the chip and the controller.

Figure 4:
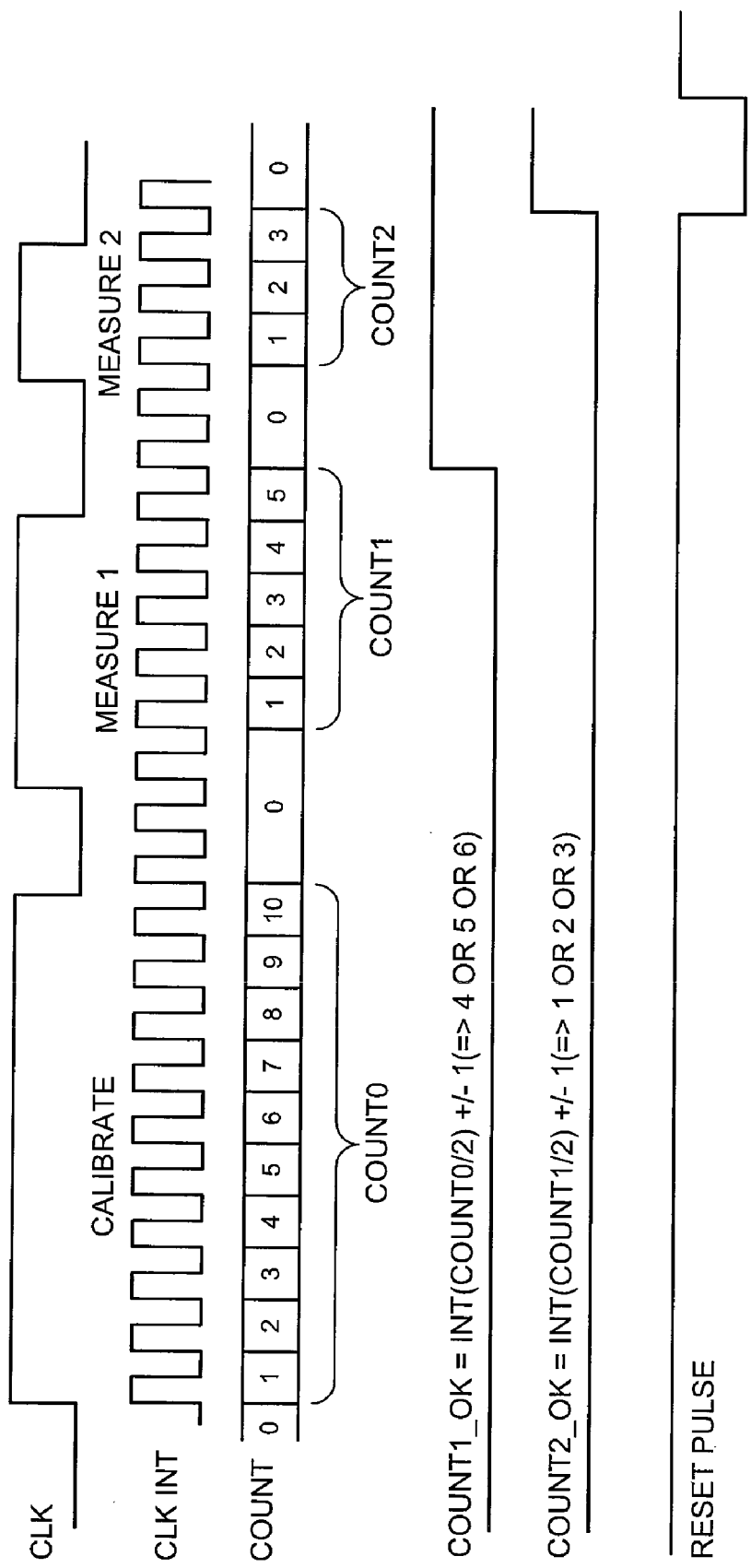
FIG. 4 is a further timing diagram illustrating the method of operation of the present invention.

Referring now to FIG. 4, a more detailed timing diagram is shown with the external CLK, internal CLK_INT, COUNT, COUNT1_OK, COUNT2_OK, and RESET PULSE signals shown, that correspond to the above detailed description.

The embodiments of the present invention shown herein can be modified as follows:

1) The external CLK need not be a clock signal but can be any external signal; and 2) The calibration and measurements can be performed on the positive pulse durations, negative pulse durations or a mixture of positive and negative pulse durations.

It will be apparent to those skilled in the art that various modifications and variations can be made in the present invention without departing from the spirit or scope of the invention. As would be apparent to those skilled in the art, equivalent embodiments of the present invention can be realized in firmware, software, or hardware, or any possible combination thereof. In addition, although representative block diagrams are shown for an aid in understanding the invention, the exact boundaries of the blocks may be changed and combined or separated out as desired for a particular application or implementation. Thus, it is intended that the present invention cover the modifications and variations of this invention provided they come within the scope of the appended claims and their equivalents.

I claim:

1. A reset circuit comprising:
   first, second, and third counters for receiving a first clock signal and a second clock signal;
   a first comparator coupled to an output of the first and second counters;
   a second comparator coupled to an output of the second and third counters; and
   a reset generator coupled to an output of the first comparator and to an output of the second comparator for generating a reset signal.

2. The reset circuit of claim 1 wherein the reset circuit comprises an integrated circuit.

3. The reset circuit of claim 2 wherein the first clock signal comprises an external clock signal.

4. The reset circuit of claim 2 wherein the second clock signal comprises an internal clock signal.

5. The reset circuit of claim 2 wherein the integrated circuit includes a clock pin for receiving the first clock signal and a data pin for receiving a data signal.

6. The reset circuit of claim 2 wherein the integrated circuit lacks a reset pin.

7. The reset circuit of claim 1 further comprising a divider circuit interposed between the output of the first counter and an input of the first comparator.

8. The reset circuit of claim 1 further comprising a divider circuit interposed between the output of the second counter and an input of the second comparator.

9. The reset circuit of claim 1 further comprising a finite state machine.

10. The reset circuit of claim 9 wherein the finite state machine comprises a calibrate output, a first measurement output, and a second measurement output.

11. The reset circuit of claim 10 wherein the first counter comprises an enable input coupled to the calibrate output of the finite state machine.

12. The reset circuit of claim 10 wherein the second counter comprises an enable input coupled to the first measurement output of the finite state machine.

13. The reset circuit of claim 10 wherein the third counter comprises an enable input coupled to the second measurement output of the finite state machine.

14. The reset circuit of claim 1 wherein the reset signal comprises a reset pulse.

15. A method of generating an internal reset signal for an integrated circuit lacking a reset pin comprising:
   calibrating a first clock pulse from an external clock signal;
   measuring a second clock pulse from the external clock signal;
   measuring a third clock pulse from the external clock signal; and
   generating an internal reset signal; and
   returning to an idle condition if the calibration of the first clock pulse fails, or if the measurement of the second or third clock pulse is not equal to an expected value.

16. The method of claim 15 wherein the second clock pulse width is about half that of the first clock pulse width, and the third clock pulse width is about half that of the second clock pulse width.

17. A method of generating a reset signal comprising:
   calibrating a first clock pulse from a clock signal;
   measuring a second clock pulse from the clock signal;
   measuring a third clock pulse from the clock signal; and
   generating an internal reset signal if the first clock pulse width is longer than a predetermined minimum clock pulse width, if the second clock pulse is within a first expected value range, and if the third clock pulse is within a second expected value range.

18. A method of generating a reset signal for an integrated circuit comprising:
   calibrating a first clock pulse from an external signal;
   measuring a second clock pulse from the external signal;
   measuring a third clock pulse from the external signal; and
   generating an internal reset signal if the first clock pulse width is longer than a predetermined minimum clock pulse width, if the second clock pulse is within a first expected value range, and if the third clock pulse is within a second expected value range.

* * * * *